US012594211B2

(12) United States Patent
Odashima et al.

(10) Patent No.: US 12,594,211 B2
(45) Date of Patent: Apr. 7, 2026

(54) WALKING ASSIST DEVICE

(71) Applicant: TOYOTA JIDOSHA KABUSHIKI KAISHA, Toyota (JP)

(72) Inventors: Tadashi Odashima, Toyota (JP); Hideaki Hattori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 804 days.

(21) Appl. No.: 17/943,272

(22) Filed: Sep. 13, 2022

(65) Prior Publication Data

US 2023/0131281 A1 Apr. 27, 2023

(30) Foreign Application Priority Data

Oct. 22, 2021 (JP) ................................ 2021-172787

(51) Int. Cl.
*A61H 3/00* (2006.01)
*A61H 1/02* (2006.01)

(52) U.S. Cl.
CPC .............. *A61H 3/00* (2013.01); *A61H 1/024* (2013.01); *A61H 2201/0165* (2013.01); *A61H 2201/14* (2013.01); *A61H 2201/1445* (2013.01); *A61H 2201/164* (2013.01); *A61H 2201/165* (2013.01)

(58) Field of Classification Search
CPC .. A61H 3/00; A61H 1/024; A61H 2201/5053; A61H 2201/1445; A61H 2201/165; A61H 2201/0165; A61H 2205/102; A61H 1/0237; A61H 2201/14; A61F 5/0125; A61F 2005/0137; A61F 5/0123; A63B 23/0494; A63B 23/1281; A63B 23/4011; A63B 23/157; A63B 2220/54; B25J 9/0006

See application file for complete search history.

(56) References Cited

U.S. PATENT DOCUMENTS 10,278,885 B1 * 5/2019 Smith ...................... A61H 3/00
11,022,206 B1 * 6/2021 Krebs ..................... F16H 48/08
2013/0012852 A1 * 1/2013 Imaida ................... A61H 1/024
602/16
2018/0200136 A1 7/2018 Yamazaki
2021/0063422 A1 3/2021 Yamashita et al.

(Continued)

FOREIGN PATENT DOCUMENTS

CN 108904219 A * 11/2018 .......... A61H 1/0266
CN 113018112 A 6/2021

(Continued)

*Primary Examiner* — Brandy S Lee
*Assistant Examiner* — Rohan Patel
(74) *Attorney, Agent, or Firm* — OLIFF PLC.

(57) ABSTRACT

A walking assist device includes a pair of link members rotatably connected to each other at an output shaft situated at a location corresponding to a knee of a user, one link member being fixed to a thigh side of the user, and another link member being fixed to a lower leg side of the user, a rotary damper that generates a resistance force that is conveyed to the output shaft and that acts against rotation of the link members around the output shaft, a one-way gear that limits the resistance force generated by the rotary damper to one of directions of the rotation of the link members around the output shaft, and a clutch that switches between conveyance and non-conveyance of the resistance force from the rotary damper.

7 Claims, 3 Drawing Sheets

(56) References Cited

U.S. PATENT DOCUMENTS

| | | | | |
|---|---|---|---|---|
| 2021/0169727 | A1 | 6/2021 | Maekita et al. | |
| 2022/0313534 | A1 * | 10/2022 | Farris | A61H 1/024 |

FOREIGN PATENT DOCUMENTS

| | | | | | |
|---|---|---|---|---|---|
| CN | 113133899 | A | * | 7/2021 | A61H 1/0237 |
| JP | 2018-114175 | A | | 7/2018 | |
| JP | 2019-086418 | A | | 6/2019 | |
| JP | 2021-090515 | A | | 6/2021 | |
| WO | WO-2018147980 | A1 | * | 8/2018 | A61H 1/024 |
| WO | WO-2018178897 | A1 | * | 10/2018 | A61F 5/0125 |

* cited by examiner

10

WALKING ASSIST DEVICE

CROSS-REFERENCE TO RELATED APPLICATION

This application claims priority to Japanese Patent Application No. 2021-172787 filed on Oct. 22, 2021, incorporated herein by reference in its entirety.

BACKGROUND

1. Technical Field

The disclosure relates to a walking assist device.

2. Description of Related Art

In recent years, development of walking assist devices for assisting users to walk in rehabilitation situations and so forth, for practical use, is being advanced. Such a walking assist device is attached to a leg of the user, and is configured to assist extension movements of a knee joint of the user. Japanese Unexamined Patent Application Publication No. 2018-114175 (JP 2018-114175 A) discloses technology that uses a mechanism in which a pair of link members, respectively provided along a thigh and a lower leg of the leg, pivot about a knee joint.

SUMMARY

The link members as disclosed in JP 2018-114175 A can be made to generate resistance force with respect to pivoting movement of the knee joint, in accordance with the state of the user walking, by being connected by a damper or the like having viscous resistance.

For example, a linear damper can be used as the damper. However, the range of extension and compression of linear dampers is limited. Accordingly, when using linear dampers, resistance force can be generated within the range of extension and compression thereof, but there is demand for reducing the limitations of the resistance force generation range due to the extension and compression range, and realizing a walking assist device that is capable of handling a broader scope of usage situations.

The disclosure provides a walking assist device that can reduce the limitations of the resistance force generation range.

A walking assist device according to an aspect of the disclosure is attached to a leg of a user and assists the user in walking. The walking assist device includes a pair of link members rotatably connected to each other at an output shaft situated at a location corresponding to a knee of the user, one link member being fixed to a thigh side of the user, and another link member being fixed to a lower leg side of the user, a rotary damper that generates a resistance force that is conveyed to the output shaft and that acts against rotation of the link members around the output shaft, a one-way gear that limits the resistance force generated by the rotary damper to one of directions of the rotation of the link members around the output shaft, and a clutch that switches between conveyance and non-conveyance of the resistance force from the rotary damper. Thus, using the rotary damper, it is possible to reduce the limitations of the resistance force generation range due to the extension and compression range as in the linear damper. In addition, on this premise, using the one-way gear and the clutch to enable adjustment of the range in which the rotary damper generates resistance force enables switching resistance force generation on and off in accordance with movement of the user, instead of keeping a state in which the resistance force is always being applied to movement of the user.

Also, the walking assist device according to the above aspect of the disclosure may further include a control unit that controls switching between conveyance and non-conveyance of the resistance force by the clutch. This provides a degree of freedom to switching the resistance force generation on and off in accordance with movement of the user.

The disclosure provides a walking assist device that can reduce the limitation of the resistance force generation range.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
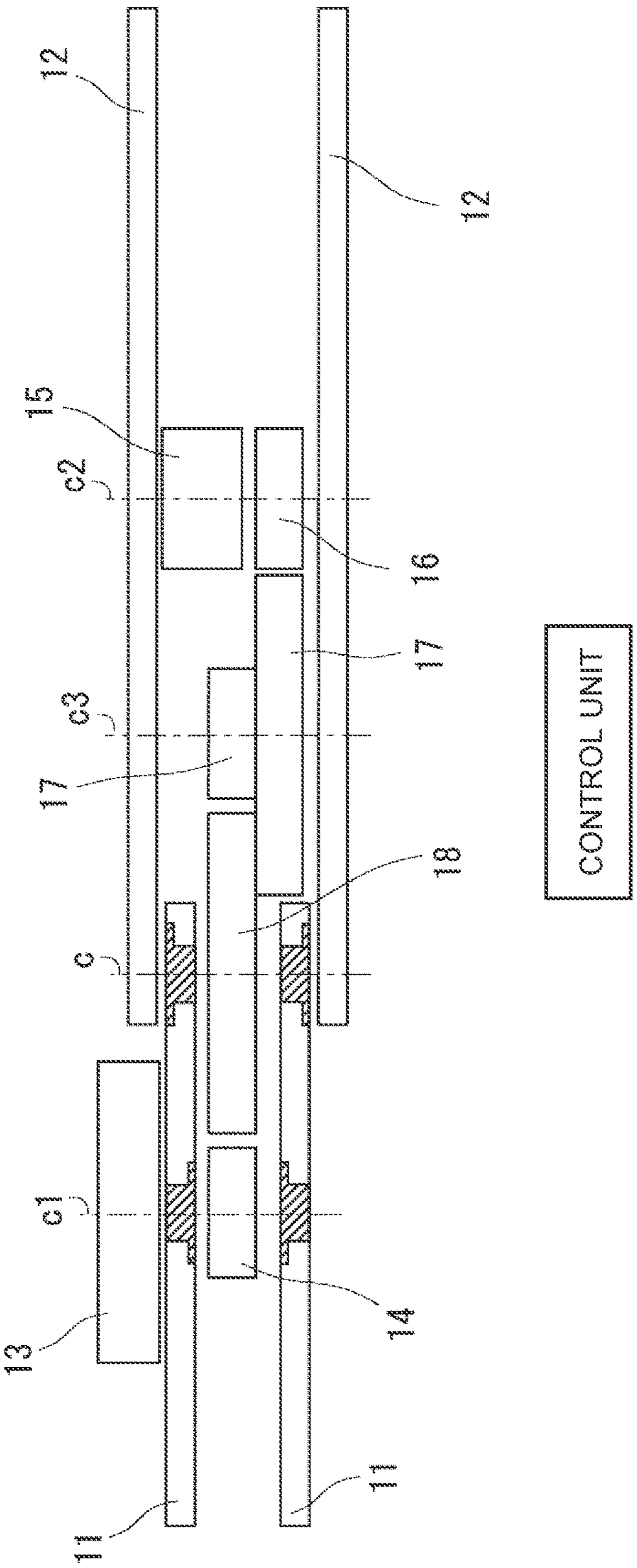
FIG. 1 is a configuration diagram of a walking assist device according to a first embodiment.

Embodiments will be described below with reference to the drawings. Note that the drawings are simplified, and accordingly the technical scope of the embodiments should not be narrowly interpreted based on the illustrations in the drawings. Also, the same components are denoted by the same signs, and repetitive description will be omitted. Further, in the following embodiments, when the number or the like (including count, numerical value, quantity, range, and so forth) of components is referred to, this particular number is not limiting, and the number may be the particular number or more, or the particular number or less, unless explicitly stated otherwise, or clearly limited to the particular number in principle, or the like.

Furthermore, in the following embodiments, the components are not necessarily essential, unless explicitly stated otherwise, or clearly considered to be essential in principle, or the like. Similarly, in the following embodiments, when shapes, positional relations, and so forth of the components and the like are referred to, shapes and so forth that are substantially close to or similar to the shapes and so forth are included therein, unless explicitly stated otherwise, or clearly considered to be otherwise in principle, or the like. This also applies to the above numbers and the like (including count, numerical value, quantity, range, and so forth).

Background of Study

There is known a walking assist device that provides stable walking with peace of mind, by preventing knee buckling while walking. Many walking assist devices use actuators such as electric motors. However, using such actuators has problems of large size and excessive weight of the walking assist device. Accordingly, a solution that uses a damper mechanism having viscous resistance can be applied.

The viscous resistance used in a damper mechanism of the walking assist device needs to increase or decrease in accordance with the timing of walking, i.e., resistance force generation needs to be switched on and off. Accordingly, in addition to a function of generating sufficient resistance force, a function of controlling the switching of the resistance force generation between on and off is also indispensable for the damper mechanism. Currently, a linear damper that exhibits viscous resistance on a compression side of the extension and compression actions is used for the damper mechanism. A damper that is capable of switching resistance force generation on and off by opening and closing an internal diaphragm, by an external resistance force adjustment knob in particular, is employed as the linear damper.

Figure 3:
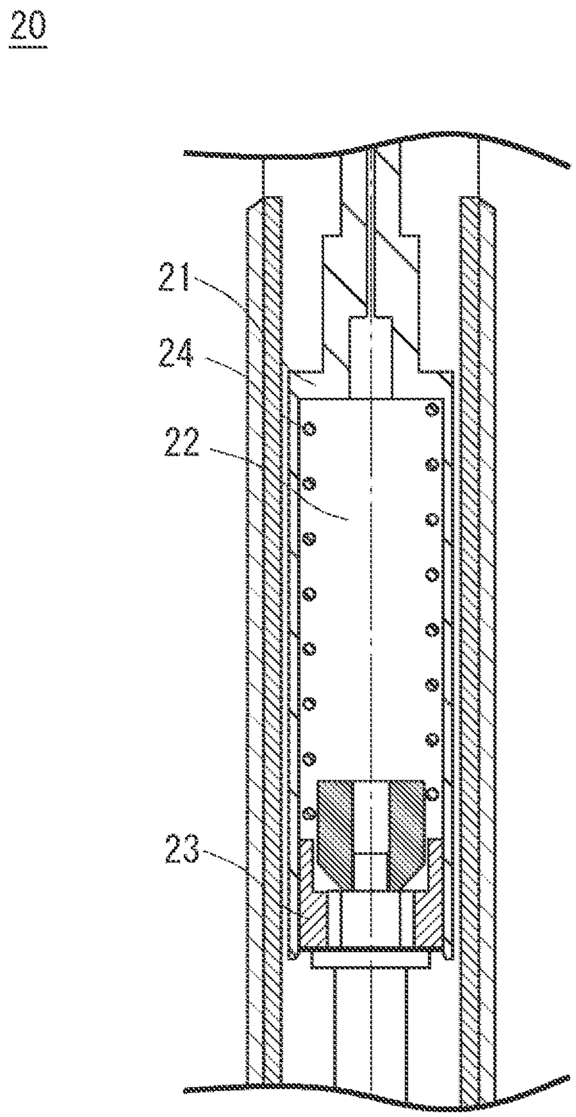
FIG. 3 RELATED ART
FIG. 3 is a diagram illustrating a structure of a linear damper used in a walking assist device according to related art.

A structure of a linear damper 20 used in a walking assist device according to the related art will be described with reference to FIG. 3. FIG. 3 is a diagram illustrating the structure of the linear damper 20. As illustrated in FIG. 3, in the linear damper 20, an inner tube 21 is filled with oil 22, and a piston ring 23 causes the oil 22 to flow in accordance with the extension and compression actions. Further, the linear damper 20 is provided with a compression spring 24 in the inner tube 21, and accordingly functions as having viscous resistance. Moreover, the resistance of the linear damper 20 increases as the flow speed of the oil 22 with which the inner tube 21 is filled increases. That is to say, the resistance of the linear damper 20 is substantially proportionate to the operating speed of a piston.

When the linear damper 20 is used in the walking assist device, there are the following two problems.

The first problem is a point in that once the damper mechanism is fully compressed, no more resistance force can be produced. As described above, the viscous resistance of the linear damper 20 is proportionate to the speed. Accordingly, when sudden knee buckling occurs, the linear damper 20 needs to plunge the piston at a high speed, in order to exert a large resistance force thereto. In the linear damper 20, when the amount of compression per unit angle of knee joint flexion is great, the damper will be completely compressed before the knee is completely bent. Accordingly, the joint angle range for exerting a large resistance force does not increase. Thus, the applicable joint angle range is narrowed, and accordingly there is a possibility that situations in which the walking assist device can be used will be limited.

The second problem is a point in that there are cases in which time is required for the extension operation following the damper mechanism being compressed, and the mechanism for assisting extension increases resistance force of the damper when the viscous force is off. When unloaded, the compressed damper is extended by the compression spring 24. Once the linear damper 20 is used, there is a time span during which no resistance force is generated from the extension of the damper mechanism to the next compression.

The above two problems are caused by the mechanism of the linear damper 20. Accordingly, as long as the linear damper 20 is used for the damper mechanism of the walking assist device, these problems are inevitable. Now, a walking assist device 10 according to the following embodiment that can solve such problems has been found.

EMBODIMENTS

Figure 2:
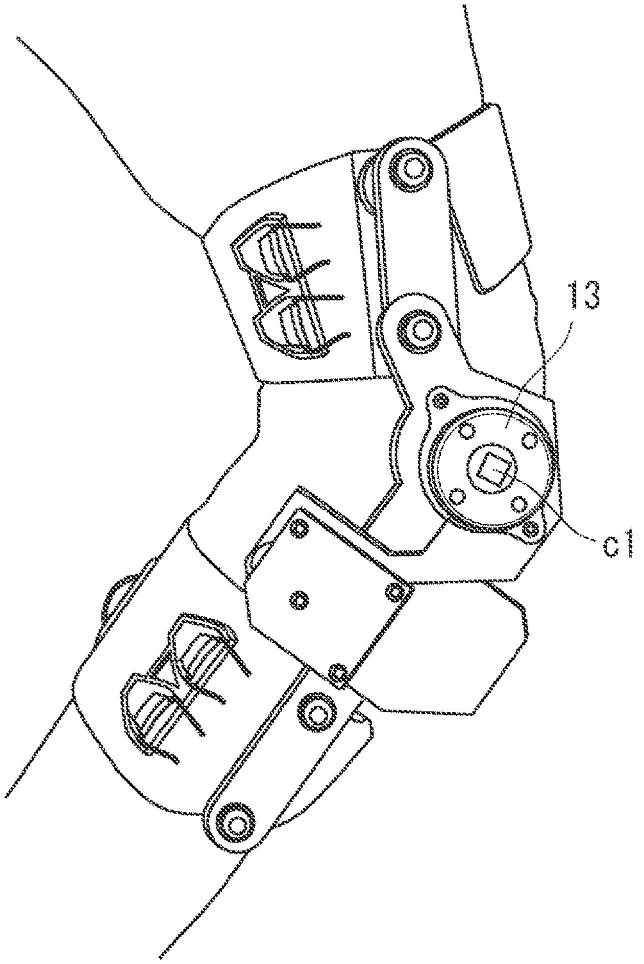
FIG. 2 is a diagram partially illustrating an external appearance of the walking assist device according to the first embodiment.

The walking assist device 10 according to the present embodiment will be described with reference to FIGS. 1 and 2. FIG. 1 is a configuration diagram of the walking assist device 10 according to the present embodiment. FIG. 2 is a diagram partially illustrating an external appearance of the walking assist device 10 according to the present embodiment. As illustrated in FIG. 2, the walking assist device 10 is attached to a leg of a user to assist the user in walking.

The walking assist device 10 illustrated in FIG. 1 includes a thigh side link member 11, a lower leg side link member 12, a rotary damper 13, a one-way gear 14, a clutch 15, a clutch gear 16, and gears 17 and 18. The thigh side link member 11 and the lower leg side link member 12 are an example of a pair of link members.

The thigh side link member 11 is a member fixed to a thigh of the user. The lower leg side link member 12 is a member fixed to a lower leg of the user. Respective one end portions of the thigh side link member 11 and the lower leg side link member 12 are connected at an output shaft c and are rotatably fixed. The output shaft c is a shaft located at a position corresponding to the knee of the user.

The rotary damper 13 is fixed to the thigh side link member 11. The rotary damper 13 generates resistance force that is conveyed to the output shaft c. The resistance force generated by the rotary damper 13 is a resistance force that acts against rotational movement of each of the thigh side link member 11 and the lower leg side link member 12 at the output shaft c. The rotary damper 13 is a rotary-type damper that has a rotating mechanism and generates resistance force against a rotational force.

The one-way gear 14 limits the direction in which the resistance force generated by the rotary damper 13 is applied to the output shaft c. The one-way gear 14 limits the resistance force generated by the rotary damper 13 to one of the rotation directions of the thigh side link member 11 and the lower leg side link member 12. The one-way gear 14 is a gear that conveys torque to the output shaft c when the knee is being bent, which is during forward rotation, and is idled when the knee is being extended, which is during reverse rotation. The rotary damper 13 and the one-way gear 14 are fixed to a shaft c1. The one-way gear 14 and the gear 18 mesh with each other. Accordingly, the resistance of the rotary damper 13 is conveyed to the output shaft c.

The clutch 15 switches between conveyance and non-conveyance of the resistance force by the rotary damper 13 in either the thigh side link member 11 or the lower leg side link member 12. The clutch 15 is fixed to the lower leg side link member 12 that is different from the thigh side link member 11 to which the rotary damper 13 is fixed. Note that in the example in FIG. 1, the rotary damper 13 is fixed to the thigh side link member 11, but this is not limiting, and the rotary damper 13 may also be fixed to the lower leg side link member 12. In this example, the clutch 15 is fixed to the thigh side link member 11. The rotary damper 13 and the clutch 15 do not necessarily have to be provided on different link members when gears (not limited in number) between the output shaft c and the shaft c1 are imparted with a clutch function. Note however, when the definition of the clutch here is an arrangement that switches between rotation and fixation and that is fixed to a link member, the rotary damper 13 and the clutch 15 need to be fixed to different link members.

The clutch 15 can be engaged with the clutch gear 16. The clutch 15 and the clutch gear 16 are fixed to a shaft c2 that is optionally disposed. In a state in which the clutch 15 is fixing the clutch gear 16, i.e., when the clutch 15 is on, rotation between the clutch gear 16 and the lower leg side link member 12 is fixed at the shaft c2. The clutch gear 16 and the gear 17 mesh with each other. Also, the one-way gear 14 meshes with the gear 18. Further, the gear 17 and the gear 18 mesh with each other. Accordingly, when the clutch 15 is not fixing the clutch gear 16, i.e., when the clutch 15 is off, the clutch gear 16 and the gears 17 and 18 are idled.

Also, the one-way gear 14 is fixed to the shaft c1, and accordingly applies torque in a direction not permitted, but since the gear 18 is idled, torque is not conveyed to the output shaft c.

The gear 17 is rotatably fixed on a shaft c3 that is optionally disposed, and the gear 18 is rotatably fixed on the output shaft c. Reduction ratios from the output shaft c to the rotary damper 13 and the clutch 15 are both smaller than 1. That is to say, the shaft of the rotary damper 13 or the clutch 15 rotates equal to or more than one rotation with respect to one rotation of the gear 18 of the output shaft c.

The walking assist device 10 enables the fundamental problem of the linear damper 20 to be circumvented by employing the rotary damper 13 that is a rotary type and continues to generate resistance force as long as it rotates, in the damper mechanism. When the clutch 15 is in the on state, all of the gears are fixed to the thigh side link member 11 and the lower leg side link member 12, and the resistance force of the rotary damper 13 is conveyed to the output shaft c. When the clutch 15 is in the off state, the output shaft c1 of the rotary damper 13 is not rotated by the rotation of the lower leg side link member 12, and accordingly no resistance force is generated.

Regardless of whether the clutch 15 is on or off, when the movement of the knee causes rotation of the one-way gear 14 in an idling direction, no rotational force is conveyed to the rotary damper 13, and no resistance force is generated. Table 1 shows the relation between states that the clutch 15 is capable of assuming, and the generated resistance force, by appropriately disposing the direction of the one-way gear 14 and the number of gears. As shown in Table 1, when the clutch 15 is on, resistance is conveyed to the output shaft c via the one-way gear 14, and accordingly resistance is generated when the knee is bent. The one-way gear 14 is idled when the knee is extended, and accordingly no resistance is generated at the output shaft c, regardless of whether the clutch 15 is on or off.

TABLE 1

| | Knee bent | Knee extended |
|---|---|---|
| Clutch on | Generated | 0 |
| Clutch off | 0 | 0 |

According to the behavior shown in Table 1, the walking assist device 10 functions to keep the knee from bending while in the stance phase when walking, and to maintain a state where there is no resistance at other timings.

As described above, the walking assist device 10 uses the rotary damper 13 that is a rotary type, which can reduce the limitations of the resistance force generation range due to the extension and compression range as in the linear damper 20. Accordingly, the walking assist device 10 can be used in a broader variety of usage situations.

Further, the rotary damper 13 can generate drag regardless of the joint angle, and accordingly there is no limitation regarding the knee angle at which the resistance force is required. This solves the first problem of the linear damper 20 that the damper mechanism cannot exert any further resistance force when fully compressed. Further, the reduction ratio from the output shaft c to the rotary damper 13 is smaller than 1, whereby the rotary damper 13 rotates at a speed equal to or higher than the angular velocity of the knee joint, and accordingly, great viscous resistance is conveyed to the output shaft c. The resistance force conveyed to the output shaft c is conveyed at a reduction ratio exceeding 1, and accordingly, the effects thereof are exhibited more markedly. Thus, great resistance force can be exhibited through use of the rotary damper 13 that is compact and lightweight.

Also, no resistance force is generated during reverse rotation, due to the combination of the rotary damper 13 and the one-way gear 14, and accordingly there is no drag when the knee is extended. Further, the rotary damper 13 generates resistance force as to immediately-subsequent knee flexion from any angle, and accordingly the resistance force is immediately conveyed to the output shaft c. This solves the second problem of the linear damper 20 that there is a time period during which no resistance force is generated, from the extension of the damper mechanism to the next compression.

Note that a control unit that controls conveyance and non-conveyance of a resistance force by the clutch 15, i.e., that controls switching of the generation of the resistance force between on and off, may be used, as illustrated in FIG. 1. Even when the determination of on and off of the clutch 15 by the control unit is delayed, extension of the knee is not impeded, due to the effects of the one-way gear 14. This point is guaranteed in the same way as when using the linear damper 20. The control unit may switch the clutch 15 on and off in accordance with the rhythm of the user walking, i.e., change in the angle in accordance with the movement of the knee, and a timing based on movement of the shin.

Further, the one-way gear 14 is disposed on the shaft of the rotary damper 13 in the example in FIG. 1, but this is not limiting, and the one-way gear 14 may be disposed on the shaft of the clutch 15. When the one-way gear 14 is installed on the shaft of the clutch 15, and when the holding drag of the clutch 15 is smaller than the resistance force generated by the rotary damper 13, a bearing that has a smaller allowable torque can be selected as a bearing of the one-way gear 14. This enables reduction in the size and cost of the walking assist device 10. Also, although the walking assist device 10 has been described as being used for the knee, the walking assist device 10 is not limited to the knee, and can also be used as a device that exerts resistance force on movement of joints such as elbows and hips as well.

What is claimed is:

1. A walking assist device configured to be attached to a leg of a user and assists the user in walking, the walking assist device comprising:

- a pair of link members rotatably connected to each other at an output shaft situated at a location corresponding to a knee of the user, one link member configured to be fixed to a thigh side of the user, and another link member configured to be fixed to a lower leg side of the user;
- a rotary damper that generates a resistance force that is conveyed to the output shaft and that acts against rotation of the pair of link members around the output shaft;
- a one-way gear that limits the resistance force generated by the rotary damper to one of the directions of rotation of the pair of link members around the output shaft;
- a clutch that switches between conveyance and non-conveyance of the resistance force from the rotary damper;
- a clutch gear;
- a first gear; and
- a second gear;
- wherein:
  - the clutch can be engaged with the clutch gear;
  - the clutch gear and the first gear mesh with each other;

the second gear and the one-way gear mesh with each other; and the first gear and the second gear mesh with each other.

2. The walking assist device according to claim 1, further comprising a control unit that is configured to control switching between conveyance and non-conveyance of the resistance force by the clutch.

3. The walking assist device according to claim 1, wherein the rotary damper and the clutch are disposed with the output shaft interposed between the rotary damper and the clutch.

4. The walking assist device according to claim 1, wherein a reduction ratio from the output shaft to the rotary damper and the clutch is smaller than 1.

5. The walking assist device according to claim 1, wherein the clutch conveys the resistance force by fixing rotation of a gear coaxial with the output shaft.

6. The walking assist device according to claim 1, further comprising:

a control unit that is configured to control switching between conveyance and non-conveyance of the resistance force by the clutch, and switch the clutch on and off in accordance with a rhythm of walking of the user.

7. The walking assist device according to claim 1, wherein the one-way gear is disposed on a shaft of the clutch.

* * * * *